Dec. 21, 1965     H. L. ZIMMERMAN     3,224,291
ELECTRICAL CONTROL

Filed March 23, 1962     2 Sheets-Sheet 1

INVENTOR.
HAROLD L. ZIMMERMAN
BY
Lieber, Lieber & Miller
ATTORNEYS

Dec. 21, 1965  H. L. ZIMMERMAN  3,224,291
ELECTRICAL CONTROL
Filed March 23, 1962  2 Sheets-Sheet 2

INVENTOR.
HAROLD L. ZIMMERMAN
BY
Lieber, Lieber & Nilles
ATTORNEYS

United States Patent Office 3,224,291
Patented Dec. 21, 1965

3,224,291
ELECTRICAL CONTROL
Harold L. Zimmerman, Oshkosh, Wis.
(4471 N. 84th St., Milwaukee, Wis.)
Filed Mar. 23, 1962, Ser. No. 181,929
12 Claims. (Cl. 74—472)

This invention relates to electrical control mechanisms for selectively shifting a device to be controlled into first, second, and neutral positions.

The present invention is applicable to the control of any device having three or more positions of operation; for example, a drive system equipped with a transmission operable by a lever into forward, neutral, and reverse positions. Hydraulic controls of this type are expensive and complicated, and solenoid controls require continual energization of the solenoids in order to hold the device to be controlled in desired position, thus constituting a continuous drain of current and often resulting in overheating of the solenoid. Conventional solenoid controls wherein the solenoids continuously draw current are not suitable for operation on batteries or other sources of power having limited ampere hour capacity since it is no longer possible to shift the device once the source of power fails.

It is a general object of the invention to provide an improved electrical control for apparatus having three or more positions of operation.

It is a further object of the invention to provide a solenoid control for selectively shifting a device to be controlled into first, second, and neutral positions, wherein the solenoids for actuating the device are not energized when the device is in the first, second, and neutral positions and the solenoids are only energized when shifting between positions.

It is a further object of the invention to provide an electrical control for shifting a device into first, second, and neutral positions wherein the plungers of the solenoids which accomplish the shifting are stopped magnetically but the solenoids do not draw current when the device is in the first, second, and neutral positions.

It is another object of the invention to provide an electrical control having solenoids for shifting apparatus into three positions of operation and which magnetically stop the solenoids, thus eliminating mechanical stops and permitting manual shifting if the power source fails.

An object of one embodiment of the invention is to provide an electrical control for an engine having a forward and reverse transmission wherein, while the engine is running, no current is drawn by the solenoids which effect shifting of the transmission. A more specific aspect of this embodiment further contemplates throttle control means, either electrical or mechanical, which is operable by the same handle that controls the transmission and is correlated with actuation of the latter.

One preferred embodiment of the invention will be described with relation to an electrical system for controlling the speed and shifting of reversible boat-propelling internal combustion motors. When applying reversible internal combustion propelled motors to boats, it is extremely desirable to bring the motor to idling speed when shifting from forward to reverse and vice-versa. It is a difficult matter to do this even in motor boat installations where the motors are specially built and equipped with built-in mechanism for accomplishing the desired result.

Accordingly, it is another object of the invention to provide a compact and reliable electrical control assembly for convenient installation in inboard or outboard motor propelled boats of diverse construction.

Another object of the invention is to provide an inexpensive, universal electrical control for motor boats which may be readily installed to cooperate with various types of inboard or outboard motors.

These and other objects and advantages of the invention will appear hereinafter as this disclosure progresses, reference being had to the accompanying drawings wherein.

General

Figure 1:
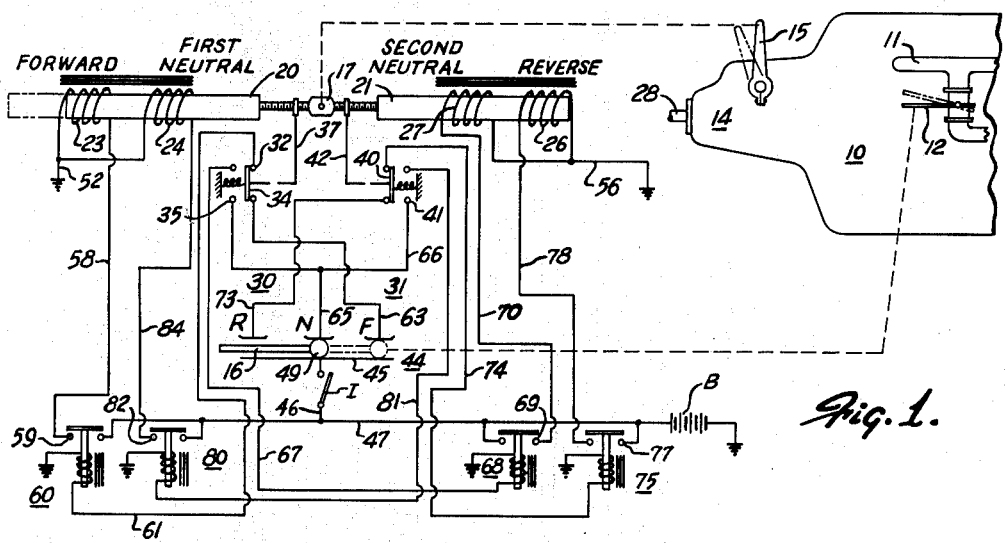
FIGURE 1 is a circuit diagram of an electrical control embodying the invention and as applied to an internal combustion engine equipped with a forward and reverse transmission, elements being shown in full lines in the neutral position and in dotted lines in the forward position.

The electrical control of the invention may be used to selectively shift any device into three or more positions of operation. The invention may be utilized to control power transmission systems equipped with a forward and reverse transmission, valves, concrete mixers, lathes, and other machinery which requires a source of energy to shift the device.

The invention is particularly adapted for cooperation with an internal combustion engine equipped with a forward and reverse transmission and a single lever which controls the speed regulating throttle of the engine and the shifting mechanism for forward and reverse rotation of the output shaft and for returning the shifting mechanism to neutral.

The circuit diagram for the electrical control of the invention shown in FIGURE 1 of the drawing will be described with relation to an internal combustion engine 10 having an intake manifold 11 to which fuel is supplied from a carburetor provided with a throttle valve controlled by an arm 12. The engine 10 is provided with a transmission 14 operable to forward, reverse, and neutral positions by a shift lever or transmission lever 15. A single control lever 16, which may be at a location remote from the internal combustion engine 10, is mechanically connected to the arm 12 of the throttle valve by any suitable means, such as a Bowden cable (not shown).

Figure 3:
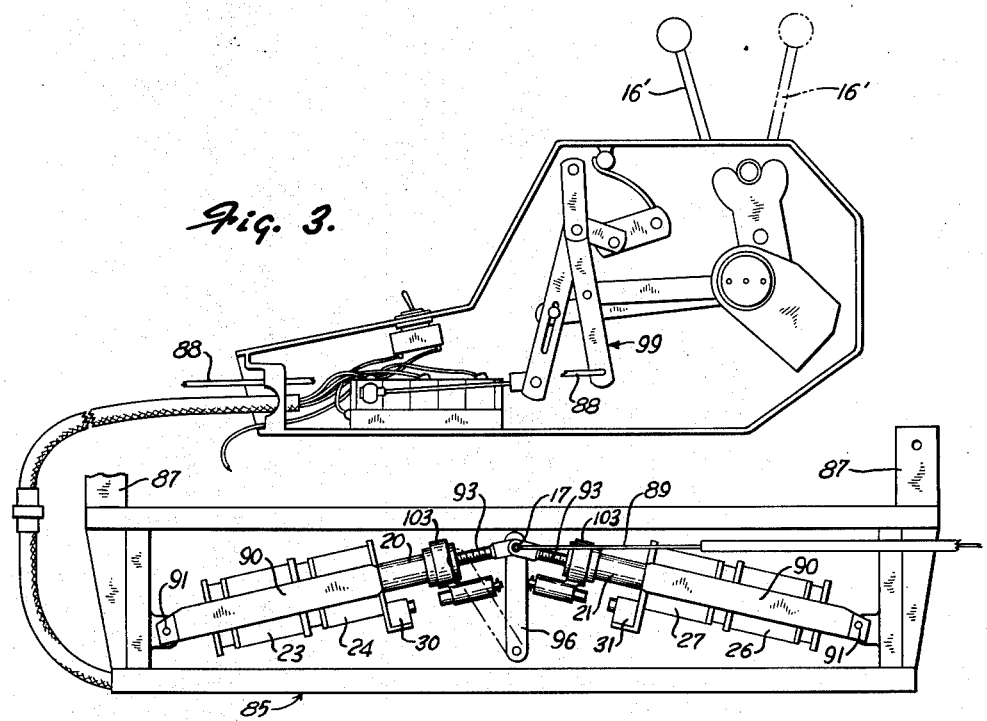
FIGURE 3 illustrates the arrangement of the elements of the control of FIGURE 1 within the casing and single lever control box shown in FIGURE 2, certain of the elements being shown in full lines in the neutral position and in dotted lines in the forward position.

Plungers 20 and 21 are connected together at their adjacent ends to form a junction 17 (FIGURES 1 and 3).

Alternatively, the junction 17 may be located within the motor housing and connected directly to lever 15.

Solenoid plunger means

Shifting of the gears of transmission 14 to forward, neutral, and reverse positions is accomplished by means of solenoids. The transmission lever 15 is mechanically connected to the junction 17 between a first solenoid plunger 20 and a second solenoid plunger 21. The plunger 20 is movable axially within a "forward" solenoid 23 and a "first neutral" solenoid 24 coaxial with the forward solenoid. Plunger 21 is similarly slidable axially within a "reverse" solenoid 26 and a "second neutral" solenoid 27 coaxial with the reverse solenoid 26. Forward solenoid 23 is adapted when energized to magnetically attract plunger 20 to a magnetically centered location wherein the magnetic centers of plunger 20 and solenoid 23 coincide, and thus shift transmission lever 15 to the forward position to drive the shaft 28 of engine 10 in a forward direction. Second neutral solenoid 27 is adapted when energized to similarly magnetically attract plunger 21 into a magnetically centered position and withdraw plunger 20 to neutral position and also shift transmission lever 15 to neutral position. Reverse solenoid 26 is adapted when energized to magnetically attract plunger 21 to a magnetically centered position therein and shift transmission lever 15 to the reverse position to drive the internal combustion engine shaft 28 in a reverse direction. First neutral solenoid 24 is adapted when energized to attract plunger 20 into a magnetically centered position and shift transmission lever 15 to neutral position. The solenoids 23, 24, 26, and 27 provide rapid, effortless, and accurate shifting of the gears of transmission 14 and eliminate jamming and grinding of gears.

Switch means

Switch means are provided to interrupt the solenoid energizing circuits when the transmission gears are in forward, neutral, and reverse positions and to prepare circuits to the neutral solenoids to return the plungers to neutral position from forward and reverse positions.

The above-mentioned switch means are adjusted to control the opening of the energizing circuits to the forward, reverse, and neutral solenoids slightly before the plungers have reached their magnetically centered position.

First and second switches 30 and 31 are controlled by the plungers 20 and 21, respectively.

First switch 30 includes stationary contacts 32 which are normally closed by a resiliently biased movable contact 34, and stationary contacts 35 which are normally open when the plungers 20 and 21 are in the neutral position. Movable contact 34 is operated by an arm 37 mounted on plunger 20 to open contacts 32 and electrically common contacts 35 slightly before plunger 20 is stopped magnetically in its centered position within forward solenoid 23. Novel means for permitting further travel of plunger 20 and after it operates switch 30 and for preventing release of switch 30 while plunger 20 is being withdrawn will be described hereinafter relative to FIGURE 4.

Second switch means 31 includes stationary contacts 39 normally closed by a spring-urged movable contact 40 and stationary contacts 41 which are open when the plungers 20 and 21 and the transmission lever 15 are in the neutral position. Movable contact 40 is operated by an arm 42 affixed to plunger 21 to open contacts 39 and close contacts 41 slightly before plunger 21 is stopped magnetically in its centered position within reverse solenoid 26.

Control lever

In the embodiment of the invention shown, the single control lever 16 operates electrical control switch 44 to selectively cause energization of the solenoids 23, 24, 26, and 27 to shift the transmission gears to forward, neutral, and reverse positions. Control switch 44 includes a "common" metallic contact 45 connected by conductors 46 and 47 to one terminal of a battery B having the other terminal grounded and also includes forward, neutral, and reverse metallic contacts F, N, and R, respectively, insulated from the common contact 45. Control switch 44 also includes a ball contact 49 operated by control lever 16 to selectively connect the common contact 45 electrically to the individual F, N, and R contacts. A "fast idle" switch I may be connected in lead 46 between common contact 45 and battery B to permit control lever 16 to actuate throttle arm 12 without shifting gears while warming up engine 10.

Figure 1

One end of each of the forward and first neutral solenoids 23 and 24 is connected to ground by a lead 52. Similarly, one end of each of the reverse and second neutral solenoids 26 and 27 is connected to ground by a lead 56. Forward solenoid 23 is energized when control lever 16 is actuated to move ball contact 49 from the position shown in full lines to the position shown in dotted lines wherein it engages contact F. The energizing circuit for forward solenoid 23 includes a conductor 58 connected to the other end of forward solenoid 23 and to one stationary contact 59 of a "forward" relay 60. The other stationary contact 59 of forward relay 60 is connected by lead 47 to the batery B, and the movable contact of forward relay 60 is adapted when relay 60 is energized to electrically common the stationary contacts 59 and complete the energizing circuit from battery B to forward solenoid 23. One end of the operating coil of relay 60 is grounded, and the other end is connected by lead 61 to one stationary contact 32 of first switch 30. The other stationary contact 32 is connected by a conductor 63 to the F contact of the control switch 44.

The stationary contacts 32 are normally closed by movable contact 34 when the control lever 16 and plungers 20 and 21 are in neutral position. Actuation of shift lever 16 from neutral to forward to move ball contact 49 from the position shown in full lines into the dotted line position and into engagement with contact F of the control switch 44 will complete an operating circuit to forward relay 60 which can be traced from battery B, conductor 47, conductor 46, fast idle switch I, common contact 45, ball contact 49, stationary contact F, conductor 63, stationary contacts 32 and movable contact 34 of first switch 30, and lead 61 to the operating coil of forward relay 60 and ground.

Forward relay 60 operates to actuate its movable contact into engagement with stationary contacts 59 and complete the energizing circuit from battery B over conductor 58 to the forward solenoid 23. When forward solenoid 23 is energized, it attracts plunger 20 and shifts the transmission lever 15 to the forward position to drive shaft 28 in a forward direction. The magnetic field of forward solenoid 23 acts to stop plunger 20 in a magnetically centered position and slightly before plunger 20 reaches its final position within forward solenoid 23, arm 37 mounted on plunger 20 operates movable contact 34 and opens contacts 32 and electrically commons or closes stationary contacts 35.

Figure 4:
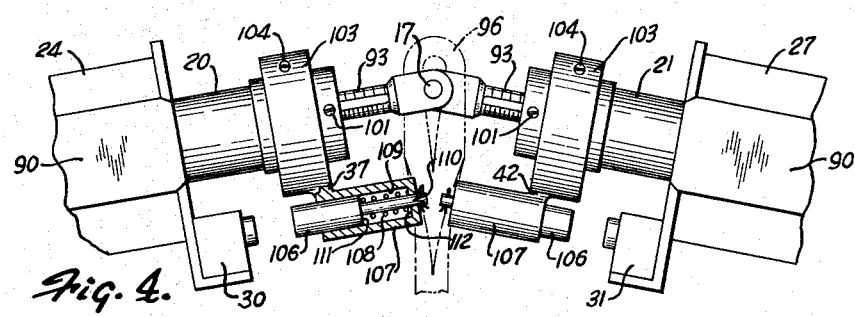
FIGURE 4 is a detail view of the solenoid plungers in neutral position showing the means for adjusting the plungers and also the switch actuating means mounted on the plungers.

As shown in FIGURE 4 and described in detail hereinafter, arm 37 carries a switch actuating plunger 106 movable relative to plunger 20 and spring means 108 which biases plunger 106 against movement relative to plunger 20, and switch actuating plunger 106 permits further travel of plunger 20 after operation of switch 30.

As previously indicated, when plunger 20 is actuated within solenoid 23, contacts 35 close to prepare an operating circuit to second neutral relay 68. An electromotive force is induced in forward solenoid 23 due to self-inductance, when the energizing circuit thereto is opened, which is in a direction to oppose the change of current, thereby causing the current to decay exponentially after the solenoid operating circuit is open. The magnetic field generated by such current tends to stop the plunger 20 at its final magnetically centered position within forward solenoid 23. The engine 10 can continue to drive shaft 28 in the forward direction while forward solenoid 23 is not energized.

Consequently, no current is drawn from battery B while engine 10 is running and forward solenoid 23 cannot be overheated as occasionally occurs in conventional solenoid controls for power transmission systems.

When shifting the transmission 14 from forward to neutral, the control lever 16 is moved counterclockwise to actuate ball contact 49 from the dotted line position to the full line position wherein it electrically connects the common contact 45 to contact N of the control switch 44.

Contact N is connected by a conductor 65 to a lead 66 common to both a stationary contact 35 of first switch 30 and a stationary contact 41 of second switch 31. The other stationary contact 35 of first switch 30 is connected by a lead 67 to the operating coil of "second neutral" relay 68.

Relay 68 has a movable contact adapted to electrically common a pair of stationary contacts 69, one of which is connected to conductor 47 and the other of which is connected by conductor 70 to the second neutral solenoid 27.

When the plunger 20 is within forward solenoid 23 and control lever 16 is shifted to neutral position to bring ball contact 49 into the position shown in full lines wherein it is in engagement with neutral contact N, an operating circuit is closed to relay 68.

This operating circuit to relay 68 may be traced from battery B, conductor 47, conductor 46, fast idle switch I, common contact 45, ball contact 49, stationary contact N, conductor 65, conductor 66, stationary contacts 35 and movable contact 34 of first switch 30, conductor 67, and the operating coil of second neutral relay 68.

Relay 68 operates its movable contact to electrically common stationary contacts 69 and complete an energizing circuit to second neutral solenoid 27 over a circuit which may be traced from battery B, conductor 47, stationary contacts 69 and the movable contact of relay 68, conductor 70, solenoid 27, and conductor 56 to ground.

Energization of second neutral solenoid 27 attracts plunger 21, and the magnetic field of solenoid 27 acts to stop plunger 21 at a magnetically centered position. Movement of plunger 21 into second neutral solenoid 27 shifts transmission lever 15 to neutral position and withdraws plunger 20 from within forward solenoid 23 to a neutral position.

As shown in FIGURE 4, switch actuating plunger 106 carried on and movable relative to arm 37 and resiliently biased by spring 108 maintains first switch 30 operated as plunger 20 is being withdrawn from forward solenoid 23, until slightly before plunger 21 is magnetically centered within second neutral solenoid 27. Disengagement of switch actuating plunger 106 from first switch 30 slightly before plunger 21 reaches its final magnetically centered position within second neutral solenoid 27 releases spring urged movable contact 34, which disengages from stationary contacts 35 to interrupt the energizing circuit to second neutral relay 68. Relay 68 releases its movable contact from engagement with stationary contacts 69 to open the energizing circuit to second neutral solenoid 27.

An electromotive force is induced in second neutral solenoid 27 due to self-inductance when its energizing circuit is interrupted which is in a direction to oppose the change of current, thereby causing the current to decay exponentially after the solenoid energizing circuit is open, and the magnetic field due to such current tends to stop the plunger 21 in its final magnetically centered position within second neutral solenoid 27.

Thus, no current is drawn from the battery B by second neutral solenoid 27 while the transmission 14 is in neutral position.

If the control shift lever 16 is then moved to the left into the reverse position, ball contact 49 is brought into engagement with stationary contact R to close an operating circuit to reverse relay 75.

Stationary contact R is connected by a conductor 73 to a stationary contact 39 of second switch 31. The other stationary contact 39 is connected by a lead 74 to the operating coil of reverse relay 75.

Reverse relay 75 includes a movable contact adapted to electrically common a pair of stationary contacts 77, one of which is connected to lead 47 and the other of which is connected by a conductor 78 to the reverse solenoid 26. Ball contact 49 thus completes an operating circuit to reverse relay R over a circuit which may be traced from battery B, conductor 47, conductor 46, fast idle switch I, common contact 45, ball contact 49, stationary contact R, conductor 73, stationary contacts 39 and movable contact 40 of second switch 31, conductor 74, and the operating coil of reverse relay 73 to ground.

Operation of reverse relay 75 actuates its movable contact into engagement with stationary contacts 77 of reverse relay 75 which completes an energizing circuit to reverse solenoid 26 from battery B over lead 78. Energization of reverse solenoid 26 magnetically attracts plunger 21 therein and shifts transmission lever 15 to the reverse position to drive shaft 28 in the reverse direction.

The magnetic field of reverse solenoid 26 acts to stop plunger 21 in a magnetically centered position.

Attraction of plunger 21 within reverse solenoid 26 also actuates arm 42 to operate movable contact 40 out of engagement with stationary contacts 39 and into engagement with stationary contacts 41 of second switch 31 slightly before plunger 21 reaches its final position, and switch actuating plunger 106 carried on arm 42 (see FIGURE 4) permits further travel of plunger 21 after second switch 31 is operated. Electrical commoning of stationary contacts 41 prepares an energizing circuit to "first neutral" solenoid 24. Opening of stationary contacts 39 interrupts the energizing circuit to reverse relay 75. An electromotive force is induced in reverse solenoid 26 due to self-inductance in the manner hereinbefore described for solenoids 23 and 27, and the magnetic field generated during the exponential decay of current tends to stop the plunger 21 in its final position within reverse solenoid 26.

The engine 10 can continue to drive shaft 28 in the reverse direction, and since reverse solenoid 26 is not energized, no current is drawn from battery 48 while the engine 10 is running and also the reverse solenoid cannot be overheated as occasionally occurs in conventional solenoid controls.

If the control lever 16 is now actuated to neutral position to bring ball contact 49 into engagement with stationary contact N of the control switch 44, an operating circuit is closed to first neutral relay 80 which may be traced from battery B, conductor 47, conductor 46, fast idle switch I, common contact 45, ball contact 49, stationary contact N, conductor 65, common conductor 66, stationary contacts 41 and movable contact 40 of second switch 31, and a lead 81 to the operating coil of first neutral relay 80 and ground. Relay 80 has a pair of stationary contacts 82, one of which is connected to conductor 47 and the other of which is connected by a conductor 84 to first neutral solenoid 24. Energization of first neutral relay 80 operates its movable contact to electrically common stationary contacts 82 and complete an energizing circuit to first neutral solenoid 24 from battery B, conductor 47, stationary contacts 82 and the movable contact of relay 80, conductor 84, first neutral solenoid 24 and conductor 52 to ground. Energization of first neutral solenoid 24 magnetically attracts plunger 20 therein and shifts the transmission lever 15 to the neutral position and also withdraws plunger 21 from within reverse solenoid 26.

The magnetic field of first neutral solenoid 24 acts to stop plunger 20 in a magnetically centered position.

Resiliently biased switch actuating plunger 106 carried on arm 42 (see FIGURE 4) maintains second switch 31 operated as plunger 21 is being withdrawn from reverse solenoid 26, until slightly before plunger 20 reaches its final position within first neutral solenoid 24. Disengagement of switch actuating plunger 106 from second switch 31 permits spring-urged movable contact 40 to open stationary contacts 41 of the second switch 31 and thus interrupt the operating circuit to first neutral relay 80. Release of relay 80 opens the energizing circuit to first neutral solenoid 24 so that no current is drawn from battery B while the shift lever 15 and the transmission gears are in neutral position.

An electromotive force is induced in first neutral solenoid 24 due to self-inductance when the energizing circuit thereto is opened which is in a direction to oppose the change of current, and the magnetic field resulting therefrom tends to stop the plunger 20 in its final position.

Figure 2:
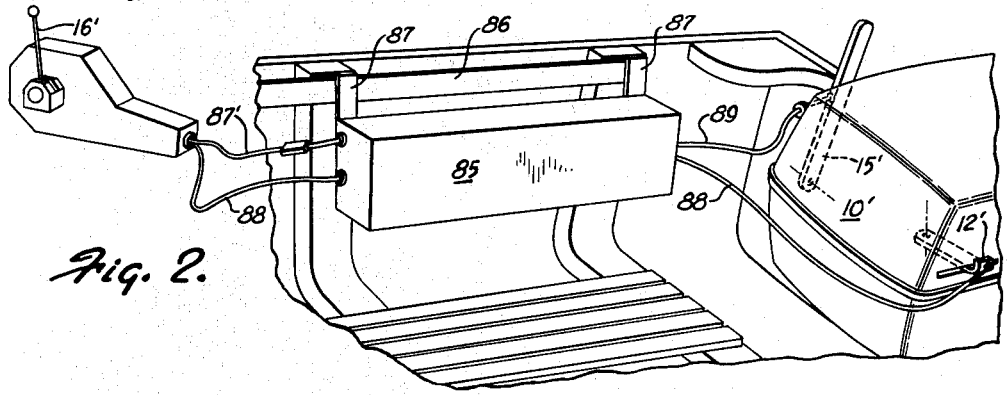
FIGURE 2 is a partial perspective view of the electrical control of FIGURE 1 installed in a boat propelled by an outboard motor having a forward and reverse transmission and a speed throttle control.

FIGURES 2 and 3

FIGURE 2 illustrates the electrical control of FIGURE 1 installed in a motor boat having a conventional internal combustion, boat-propelling outboard motor 10' and a single manual lever 16' remote from the motor which controls the speed regulating throttle 12' and the transmission shifting lever 15'.

The outboard motor 10' is detachably mounted upon the transom of the boat and may be provided with a steering lever associated directly therewith, or with a steering wheel disposed near the front of the boat and which is connected to the motor by cables in a well-known manner. A casing 85 suitably mounted in any convenient location on the boat, as on rail 86 by brackets 87, houses the solenoids 23, 24, 26, and 27 as can be seen in FIGURE 3 which illustrates the arrangement of the components within casing 85.

The single lever control 16 may be mounted at any desired location and may be connected to the components within casing 85 by an electrical cable 87' and to the throttle arm 12' of the outboard motor 10' by a mechanical throttle cable 88. A shift cable 89 emerging from casing 85 is connected to the shift lever 15' of the outboard motor 10'.

As previously mentioned, this electrical control may be mounted directly in the housing of the motor 10'.

The battery B (not shown) may be housed in any suitable portion of the boat and connected past a key and lock controlled starting switch (not shown) to the common contact 45 of the control switch 44.

As shown in FIGURE 3, annular forward and first neutral solenoids 23 and 24 are coaxially mounted on a member 90 pivotally supported on a pin 91 extending through a lug on a frame member at one end of the casing 85 so that the axis of the selonoids is inclined upwardly relative to the horizontal from one end to the center of the casing 85. Similarly, annular reverse and second neutral solenoids 26 and 27 are coaxially mounted on a similar member 90 pivotally supported on a pin 91 protruding through a lug on a frame member at the opposite end of casing 85 so that the axis of the solenoids 26 and 27 is inclined upwardly relative to the horizontal from the other end of casing 85 toward the center of the casing. Adjacent ends of the plungers 20 and 21 terminate in eye-bolts 93 which are pivotally connected together by bolt means 17 and to an engine shift handle 96 which is pivotally mounted at its lower end.

The upper end of engine shift handle 96 is pivotally connected to one end of the shift cable 89 which emerges from casing 85 and is connected at its opposite end to the shift lever 15' of outboard motor 10'.

Inasmuch as the joined ends of plungers 20 and 21 are raised above the remote ends thereof, in other words, the plungers converge upwardly, the force of gravity is in a direction to hold plungers 20 and 21 in the forward and reverse positions, thus assuring that the transmission gears are not moved out of forward and reverse positions as a result of vibration or movement of the boat.

The single control lever 16 is moved in a clockwise direction from the neutral position shown in full lines in FIGURE 3 to the position shown in dotted lines in order to actuate ball contact 49 into engagement with forward stationary contact F and in the counterclockwise direction to move ball contact 49 into engagement with reverse stationary contact R. When control lever 16 is moved clockwise, forward solenoid 23 is energized, and the engine shift handle 96 is actuated to the dotted line position shown in FIGURE 3, and the transmission lever 15 is shifted into forward position to place the motor into forward gear.

By continuing the clockwise movement of control lever 16, a linkage 99 operated by control lever 16 actuates throttle cable 88 to increase or decrease the forward speed of engine 10' as desired while holding ball contact 49 stationary and in engagement with contact F.

When shifting the control lever 16 from forward to neutral, second neutral solenoid 27 is energized to return engine transmission lever 15' into neutral position and the motor 10' into neutral gear.

When shifting control lever 16 from forward or reverse into neutral, the throttle or fuel supply and the resulting propulsion force will always be a minimum and motor 10' can never be shifted into either forward or reverse without reducing the speed to a minimum.

When shifting control lever 16 counterclockwise from neutral to reverse position, the reverse solenoid 26 is energized to shift the transmission lever 15' into reverse position, and by continuing this counterclockwise movement of lever 16, the linkage 99 actuates throttle cable 88 to increase or decrease the reverse speed of the boat while holding ball contact 49 stationary and in engagement with contact R.

The ends of the plungers 20 and 21 are internally threaded and engage eye-bolts 93 to permit adjustment of the stroke of the plungers 20 and 21 and also the magnetic centering of plungers 20 and 21 within neutral solenoids 24 and 27. By merely turning the plungers relative to the eye-bolts 93, the stroke of the plungers 20 and 21 is adjusted. The plungers 20 and 21 are rigidly connected to the eye-bolts 93 by set screws 101.

Figure 4

FIGURE 4 illustrates the means mounted on the solenoid plungers for holding the switches 30 and 31 operated during travel of plungers 20 and 21. Switch actuating arms 37 and 42 include adjusting collars 103 mounted on the plungers 20 and 21 by set screws 104.

The collars 103 are movable relative to the plungers 20 and 21 in a direction parallel to the plunger axis to permit adjustment of the operation of the first and second switches 30 and 31 which are mounted on the frame of first and second neutral solenoids 24 and 27, respectively. This adjustment is to correct excessive or insufficient travel of the plunger outwardly when it is traveling to neutral position. This adjustment is accomplished by loosening set screws 101 and 104, turning the plunger relative to its eye-bolt 93. The contacts of the first and second switches 30 and 31 and the spring means which bias the movable contacts 34 and 41 thereof toward movement are not shown in the drawing.

A cylindrical portion 107 provided at the end of each radial arm 37 and 42 has its axis parallel to that of the corresponding solenoid plunger 20 or 21. An axial bore 109 provided in each cylindrical portion 107 slidably receives a switch actuating plunger 106 to permit movement of plunger 106 relative to the solenoid plunger 20 or 21. One end 110 of switch actuating plunger 106 is reduced in diameter to provide a shoulder 111 and protrudes through a clearance aperture in the end wall 112 of cylindrical portion 107. The spring 108 surrounds the reduced diameter end 110 of switch actuating plunger 106 and is compressed between shoulder 111 and the end wall 112 to resiliently bias plunger 106 in a direction to operate switch 30 or 31.

After a solenoid plunger 20 or 21 has moved sufficiently from the neutral position to bring the switch actuating plunger 106 into engagement with the corresponding switch 30 or 31, the spring biased plunger 106 holds the switch 30 or 31 operated by sliding within bore 109 and permits further travel of the solenoid plunger 20 or 21 until the plunger reaches its final magnetically centered position.

Figure 5:
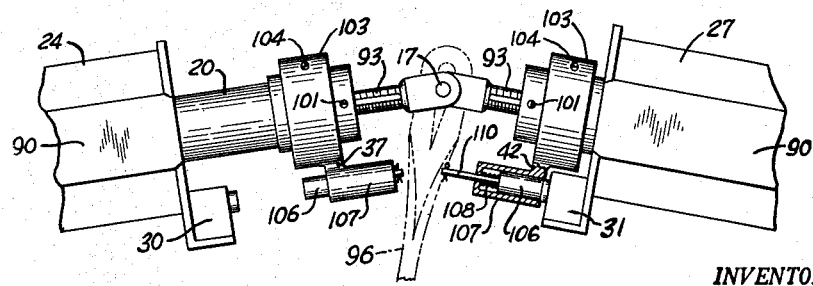
FIGURE 5 is similar to FIGURE 4 but with the reverse plunger shown within the reverse solenoid.

*Figure 5*

As shown in FIGURE 5 which illustrates the reverse position, spring 108 is almost fully compressed, and the reduced diameter portion 110 of switch actuating plunger 106 protrudes a considerably greater distance beyond the end wall 112 than it did in FIGURE 4, thus indicating that plunger 21 has traveled this same distance after switch 31 was operated and before plunger 21 reached its final magnetically centered position.

When control lever 16 is returned to neutral position and first neutral solenoid 24 is energized to attract plunger 20, the compressed spring 108 keeps switch actuating plunger 106 in engagement with switch 31 and maintains switch 31 operated, while plunger 21 is being withdrawn, until slightly before plunger 20 reaches its magnetically centered position within first neutral solenoid 24.

Figure 6:
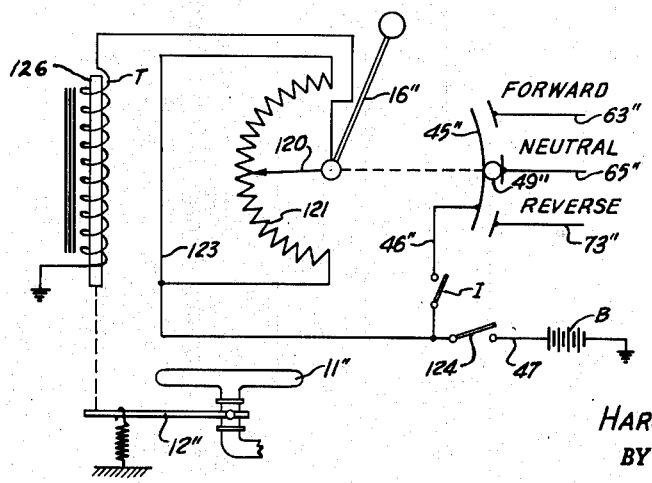
FIGURE 6 is a partial circuit diagram of an embodiment of the invention provided with solenoid throttle regulating means.

*Figure 6*

FIGURE 6 is a partial circuit diagram of an embodiment of the invention wherein a single control lever is adapted to sequentially shift apparatus to any of three positions of operation and to control the speed regulating throttle of the apparatus and wherein the throttle is electrically controlled rather than being mechanically controlled as in the embodiments of FIGURES 1–3.

Elements similar to those of the embodiments of FIGURES 1–3 are given like reference numerals in FIGURE 6 with the addition of the double prime (″) designation.

The single control lever 16″ is rotated to selectively actuate a ball contact 49″ into engagement with stationary contacts F, N, and R and thus selectively connect contacts F, N and R electrically with common contact 45″ and the battery B in a manner similar to that described for the embodiments of FIGURES 1–3 to selectively complete energizing circuits to the forward, neutral, and reverse solenoids. Control lever 16″ also actuates the sliding arm 120 of a potentiometer 121. The ends of the potentiometer 121 are connected together by a conductor 123 which is connected to battery B through an ignition switch 124. The sliding arm 120 is connected to one end of a throttle solenoid T and the other end of the solenoid T is grounded. The plunger 126 of throttle solenoid T is mechanically connected to the arm 12″ for controlling the throttle valve of a carburetor having an intake manifold 11″. The sliding arm 120 is in mid-position, and thus the voltage applied to the throttle solenoid T is a minimum, when control lever 16″ is in neutral position.

Thus, the apparatus being controlled will always be at idling speed if the control lever 16″ is in neutral position when the apparatus is started, and further the speed is always reduced to a minimum whenever the control arm 16″ is shifted from forward through neutral to reverse and vice-versa.

*Résumé*

From the foregoing description, it will be apparent that the invention provides a reliable, simple, and compact control for selectively shifting any apparatus into first, second, and neutral positions and which is readily adaptable to various types of drives and power transmission systems.

No current is drawn by the solenoids in any of the positions of operation.

When the control of the invention is utilized with a forward and reverse transmission, the transmission gears are shifted rapidly, accurately, and effortlessly, and jamming and grinding of gears is eliminated.

Novel means are provided to magnetically stop the solenoid plungers, and the plungers can be readily adjusted in the solenoids by merely rotating them.

When the invention is applied to a motor boat, the single lever control eliminates the use of numerous cables for controlling the functioning of the boat, and the safe manipulation of the boat is assured by always bringing the motor throttle to neutral before causing the motor to shift from one gear to another.

Due to the absence of any mechanical stops, an important safety factor has been provided with the present invention and results in the ability to manually control the device in the event of power failure.

This application is a continuation-in-part of my copending application, Serial No. 37,278, filed June 20, 1960, entitled "Electrical Control for Motor Boats," and now abandoned.

Various modes of carrying out the invention are contemplated as being within the scope of the following claims particularly pointing out and distinctly claiming the subject matter which is regarded as the invention.

I claim:

1. An electrical control for a device operable into first, second, and neutral positions comprising, in combination; solenoid plunger means adapted to be connected to said device; forward, neutral, and reverse solenoid means for said plunger means adapted when energized to selectively attract said plunger means to a magnetically centered position therein and shift said device into said first, second, and neutral positions; control means for selectively energizing said forward, reverse, and neutral solenoid means; and switch means controlled by said plunger means for opening the energizing circuit to each solenoid means slightly before said plunger means has been stopped in said magnetically centered position; said plunger means being brought to rest in said magnetically centered position by the magnetic field of said solenoid means generated by the electromotive force induced therein due to self-inductance after opening of said energizing circuit, whereby said solenoid means are not energized and do not draw current when said device is in said first, second, and neutral positions.

2. An electrical control for a device operable into first, second, and neutral positions comprising, in combination, solenoid plunger means adapted to be connected to said device; forward, neutral, and reverse solenoid means for said plunger means adapted when energized to selectively attract said plunger means to a magnetically centered position therein and shift said device into said first, second, and neutral positions; control means for selectively energizing said forward, reverse, and neutral solenoid means; switch means adapted when operated to open said energizing circuits to said forward and reverse solenoid means and to close normally open contact means in said energizing circuit to said solenoid means; means including a switch actuating member carried on but movable relative to said plunger means and resilient means biasing said member against movement relative to said plunger means for operating said switch means slightly before said plunger means has been stopped in said magnetically centered position in said forward and reverse solenoid means and for releasing said switch means slightly before said plunger means has been stopped in said magnetically centered position in said neutral solenoid means; said plunger means being brought to rest in a magnetically centered position by the magnetic field in each of said solenoid means by the magnetic field generated by the electromotive force induced therein due to self-inductance after opening of the energizing circuit thereto, whereby said solenoid means are not energized and do not draw current when said device is in said first, second, and neutral positions, movement of said switch actuating member relative to said plunger means permitting further travel of said plunger means after operation of said switch means and holding said switch means operated while said plunger means is being attracted within said neutral solenoid means.

3. An electrical control for a device operable into first, second, and neutral positions comprising, in combination, solenoid plunger means adapted to be connected to said device; forward, neutral, and reverse solenoid means adapted when energized to selectively attract said plunger means to a magnetically centered position therein and shift said device into its first, second, and neutral positions; control means for selectively energizing said forward, reverse, and neutral solenoid means; switch means for opening the energizing circuit to each of said solenoid means; means mounted on said plunger means for operating said switch means slightly before said plunger means has been stopped in said magnetically centered position in each said solenoid means and including a switch actuating member movable relative to said plunger means and resilient means for biasing said member against movement relative to said plunger means, movement of said resiliently biased switch actuating member relative to said plunger means permitting said member to maintain said switch means in operated position as said plunger means travels, said plunger means being brought to rest in said magnetically centered position in each said solenoid means by the magnetic field generated by the electromotive force induced therein due to self-inductance after opening of the energizing circuit thereto, whereby said solenoid means are not energized and do not draw current when said device is in said first, second, and neutral positions.

4. An electrical control for a device operable into first, second, and neutral positions comprising, in combination; solenoid plunger means adapted to be connected to said device; forward, reverse, and neutral solenoid means for said plunger means adapted when energized to selectively attract said plunger means to a magnetically centered position therein and shift said device into said first, second, and neutral positions; control means for selectively energizing said forward, reverse, and neutral solenoid means; switch means for opening the energizing circuit to each solenoid means; resiliently biased switch operating means carried on but movable relative to said plunger means for operating said switch means slightly before said plunger means has been stopped in said magnetically centered position in each said solenoid means; said plunger means being brought to rest in said magnetically centered position by the magnetic field of said solenoid means generated by the electromotive force induced therein due to self-inductance after opening of said energizing circuit; whereby said solenoid means are not energized and do not draw current when said device is in said first, second, and neutral positions, movement of said switch actuating means relative to said plunger means permitting travel of said plunger means while said switch means is held operated.

5. An electrical control for a device operable into first, second, and neutral positions comprising, in combination; first and second plungers connected to said device; forward and first neutral solenoids for said first plunger each of which is adapted when energized to attract said first plunger to a magnetically centered position therein and shift said device into forward and neutral positions respectively; reverse and second neutral solenoids for said second plunger each of which is adapted when energized to attract said second plunger to a magnetically centered position therein and shift said device into reverse and neutral positions respectively; control means having forward, neutral, and reverse positions for selectively energizing said first and second solenoids when actuated to said forward and reverse positions and for selectively energizing said first neutral solenoid when actuated from reverse to neutral position and said second neutral solenoid when actuated from forward to neutral position; said control means including switch means actuated by said first and second plungers for opening the energizing circuit to each solenoid slightly before the corresponding plunger has been stopped in said magnetically centered position within said solenoid; whereby said solenoids are not energized and do not constitute a drain of current when said device is in said first, second, and neutral positions; said plungers being brought to rest at said magnetically centered position within said solenoids by the magnetic field generated by the electromotive force induced therein due to self-inductance after opening of the energizing circuit thereto.

6. An electrical control for selectively shifting a device to be controlled into first, second, and neutral positions, comprising, in combination; plunger means connectable to said device; forward, neutral, and reverse solenoid means for said plunger means and when energized adapted to selectively attract said plunger means therein and shift said device into first, second, and neutral positions; control means including a single control member operable between forward, neutral, and reverse positions and control switch means actuated by said control member for selectively energizing said forward, reverse, and neutral solenoid means when said control member is actuated to the corresponding positions; each said solenoid means when so energized magnetically stopping said plunger means therein; and switch means controlled by said plunger means for opening the energizing circuit to each said solenoid means when said plunger means is magnetically stopped therein; whereby said solenoid means do not draw current when said device is in said first, second, and neutral positions.

7. In combination with an engine equipped with a forward and reverse transmission and having a throttle for regulating engine speed; plunger means connected to said transmission; forward, neutral, and reverse solenoid means for said plunger means adapted when energized to selectively attract said plunger means therein and shift said transmission into forward, neutral, and reverse positions; means including a control lever operable between forward, reverse, and neutral positions and control switch means actuated by said control lever for selectively completing energizing circuits to said forward, reverse, and neutral solenoid means when said control lever is actuated to the corresponding positions; each said solenoid means when so energized magnetically stopping said plunger means therein; switch means controlled by said plunger means for opening the energizing circuit to each said solenoid means when said plunger means is magnetically stopped therein; whereby said solenoid means do not draw current when said transmission is in said forward, neutral, and reverse positions; and means operated by said control lever for controlling said throttle.

8. In combination with a drive system equipped with a forward and reverse transmission and having a throttle for regulating output speed; solenoid plunger means connected to said transmission; forward, neutral, and reverse solenoid means for said plunger means adapted when energized to selectively attract said plunger means therein and shift said transmission into forward, neutral, and reverse positions; movable control means for simultaneously operating said throttle and selectively energizing said forward, reverse, and neutral solenoid means; each said solenoid means when so energized magnetically stopping said plunger means therein; and switch means controlled by said plunger means for opening the energizing circuit to each said solenoid means when said plunger means is magnetically stopped therein, whereby said solenoid means do not draw current when said transmission is in said forward, neutral, and reverse positions.

9. The combination defined by claim 8, further characterized in that said throttle controlling means is operated electrically.

10. An electrical control for selectively shifting a device to be controlled into first, second, and neutral positions comprising, in combination; first and second plungers pivotally joined together and connected to said device; forward and reverse solenoids respectively for first and second plungers disposed on opposite sides of the junction between said plungers and adapted when energized to magnetically attract the corresponding plunger therein along the solenoid axis and shift said device into first and second positions, control means for selectively energizing said forward and reverse solenoids, each said solenoid when so energized magnetically stopping the corresponding plunger therein, switch means controlled by said first and second plungers for opening the energizing circuits to said forward and reverse solenoids when said plungers are magnetically stopped therein, whereby said solenoids do not draw current when said device is in said first and second positions, the axes of said forward and reverse solenoids being inclined upwardly and said first and second plungers converging upwardly, whereby gravity tends to hold said plungers in their magnetically stopped position within said forward and reverse solenoids.

11. An electrical control for selectively shifting a device to be controlled, first and second plungers having adjacent ends pivotally joined together to form a juncture that is connectable to said device; forward and reverse solenoids in which said first and second plungers are slidable respectively, said solenoids being selectively energized to shift said plungers and the device connected therewith, each said solenoid when so energized magnetically stopping the corresponding plunger therein, switch means for opening the energizing circuit to said solenoid when said plunger is magnetically stopped therein, the longitudinal axes of said plungers being inclined toward one another in upwardly converging positions whereby gravity tends to hold said plungers in their magnetically stopped position within said solenoids.

12. An electrical control for selectively shifting a device to be controlled into first, second, and neutral positions, comprising, in combination, first and second plungers having adjacent ends pivotally connected together and converging upwardly, the junction between said plungers being connected to said device, a generally vertically disposed manual shift lever pivotally mounted adjacent one end and pivotally connected adjacent its other end to the junction between said plungers; coaxial forward and first neutral solenoids for said first plunger disposed on one side of said junction with their axes inclined upwardly and adapted when energized to selectively attract said first plunger along their axes into magnetically centered positions therein; coaxial reverse and second neutral solenoids for said second plunger disposed on the opposite side of said junction with their axes inclined upwardly and adapted when energized to selectively attract said second plunger along their axes into magnetically centered positions therein; control means for selectively energizing said forward solenoid, said reverse solenoid, said first neutral solenoid when said second plunger is within said reverse solenoid, and said second neutral solenoid when said first plunger is within said forward solenoid; each said solenoid when so energized magnetically stopping the corresponding plunger therein, whereby mechanical stops are eliminated and said device may be manually shifted by said shift lever if electrical power fails, and switch means controlled by said first and second plungers for opening the energizing circuit to each said solenoid when the corresponding plunger has been magnetically stopped therein.

References Cited by the Examiner
UNITED STATES PATENTS

| | | | |
|---|---|---|---|
| 2,617,311 | 11/1952 | Miller | 74—472.4 |
| 2,966,970 | 1/1961 | Morse | 74—365 |

DON A. WAITE, *Primary Examiner.*